United States Patent
Skowronek et al.

(10) Patent No.: US 9,986,011 B2
(45) Date of Patent: May 29, 2018

(54) METHOD AND APPARATUS FOR COMPUTING THE PERCEIVED QUALITY OF A MULTIPARTY AUDIO OR AUDIOVISUAL TELECOMMUNICATION SERVICE OR SYSTEM

(71) Applicant: DEUTSCHE TELEKOM AG, Bonn (DE)

(72) Inventors: Jan Janto Skowronek, Berlin (DE); Alexander Raake, Berlin (DE); Markus Vaalgamaa, Helsinki (FI); Mattias Nilsson, Sundbyberg (SE); Adriana Dumitras, London Greater London (GB); Bernhard Feiten, Berlin (DE)

(73) Assignee: DEUTSCHE TELEKOM AG, Bonn (DE)

(*) Notice: Subject to any disclaimer, the term of this patent is extended or adjusted under 35 U.S.C. 154(b) by 0 days. days.

(21) Appl. No.: 15/511,726

(22) PCT Filed: Sep. 17, 2014

(86) PCT No.: PCT/EP2014/069809
§ 371 (c)(1),
(2) Date: Mar. 16, 2017

(87) PCT Pub. No.: WO2016/041593
PCT Pub. Date: Mar. 24, 2016

(65) Prior Publication Data
US 2017/0302723 A1    Oct. 19, 2017

(51) Int. Cl.
*H04N 7/15* (2006.01)
*H04L 29/06* (2006.01)
*H04N 7/14* (2006.01)

(52) U.S. Cl.
CPC ............ *H04L 65/80* (2013.01); *H04L 65/403* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 7,653,002 B2* | 1/2010 | Hardy | H04M 3/2236 370/237 |
| 9,113,032 B1* | 8/2015 | Vander Mey | H04N 7/15 |
| 2006/0067251 A1 | 3/2006 | Hagendorf | |
| 2010/0269044 A1* | 10/2010 | Ivanyi | G06Q 30/02 715/736 |
| 2011/0141925 A1* | 6/2011 | Velenko | H04L 65/1069 370/252 |

(Continued)

FOREIGN PATENT DOCUMENTS

EP    1370101 A1   12/2003

*Primary Examiner* — Stella Woo
(74) *Attorney, Agent, or Firm* — Leydig, Voit & Mayer, Ltd.

(57) ABSTRACT

A method for estimating a quality of multiparty telecommunication with a computing device includes: (a) determining individual connection quality scores of individual connections of each participant in a multiparty telecommunication call; and (b) determining a quality score for the multiparty telecommunication call from the perspective of each participant using a function of the individual connection quality scores.

42 Claims, 1 Drawing Sheet

(56) References Cited

U.S. PATENT DOCUMENTS

| | | | | |
|---|---|---|---|---|
| 2011/0225247 A1* | 9/2011 | Anantharaman | ..... | H04M 3/568 |
| | | | | 709/206 |
| 2013/0191485 A1* | 7/2013 | Spencer | ................ | H04L 65/608 |
| | | | | 709/207 |
| 2015/0179186 A1* | 6/2015 | Swierk | .................... | G06F 3/167 |
| | | | | 704/276 |
| 2016/0021149 A1* | 1/2016 | Maistri | ................ | H04L 65/403 |
| | | | | 348/14.08 |
| 2016/0073054 A1* | 3/2016 | Balasaygun | ............. | H04N 7/15 |
| | | | | 348/14.08 |
| 2016/0227165 A1* | 8/2016 | Moorjani | ................ | H04N 7/15 |

* cited by examiner

METHOD AND APPARATUS FOR COMPUTING THE PERCEIVED QUALITY OF A MULTIPARTY AUDIO OR AUDIOVISUAL TELECOMMUNICATION SERVICE OR SYSTEM

CROSS-REFERENCE TO RELATED APPLICATIONS

This application is a U.S. National Phase application under 35 U.S.C. § 371 of International Application No. PCT/EP2014/069809, filed on Sep. 17, 2014. The International Application was published in English on Mar. 24, 2016 as WO 2016/041593 A1 under PCT Article 21(2).

FIELD

The invention relates to a method and an apparatus for estimating the quality of a telecommunication service or system as perceived by a user of the respective service or system. In particular, the invention relates to services or systems that provide communication between more than two persons. Such telecommunication scenarios are usually referred to as multiparty telecommunication or multiparty teleconferencing, whereby the communication modality can be a combination of audio & speech, video & visual information, and textual information.

BACKGROUND

With today's technical possibilities, increasing pocket-based data transmission and high processing power, and an increasing interest in telephone and video conferencing systems, the success of such systems is essentially determined by the quality provided and experienced when using them.

SUMMARY

In an exemplary embodiment, the present invention provides a method for estimating a quality of multiparty telecommunication with a computing device. The method includes: (a) determining individual connection quality scores of individual connections of each participant in a multiparty telecommunication call; and (b) determining a quality score for the multiparty telecommunication call from a perspective of each participant using a function of the individual connection quality scores.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide an appropriate quality assessment method. In addition, an assessment of the experienced quality using the present invention allows for optimization of the resources required by such systems while maintaining an appropriate level of quality, whereas the optimization may refer to all stages of a system life cycle, from design and planning, development and deployment, to running operation. Furthermore, a quality assessment using the present invention allows systems to improve the user experience by providing quality-related status information and feedback, or even automatic support and help functionality.

In an exemplary embodiment, the invention estimates the quality of a multiparty telecommunication service or system as perceived by a user of the respective service or system. Multiparty refers to the fact that more than two persons are taking part in the same telecommunication call, while those persons may be located at two or more locations and may use two or more devices.

In an exemplary embodiment, the invention provides a method of computing a multiparty quality score, where quality score also refers to overall quality from the perspective of one participant using quality scores of the individual connections from the other participants to the one participant, henceforth referred to as individual connection quality scores, whereby the mutual influence of the individual connections on each other are modeled, the amount of attention that participants pay to the individual connections are modeled, the extend of quality aspects that participants attribute to the individual interlocutors or to the system are modeled, and these models are taken into account when the overall quality score is computed.

The method for estimating a quality of multiparty telecommunication with a computing device, according to a further aspect of the present invention, comprises (a) determining individual connection quality scores of the individual connections of each participant in a multiparty audio or audiovisual telecommunication call or (b) determining a quality score for the whole multiparty telecommunication call from the perspective of each participant using a function of individual connection quality scores.

The method according to the present invention is extended by the following steps: (c) determining additional factors that influence the importance of individual connections to the overall quality and (d) including those additional factors into the computation of the overall quality.

Said determination and inclusion of additional factors may consider any combination of the following factors: (e) the mutual influence of the quality scores between the individual connections, or (f) the amount of attention a user is paying to the individual connections, or (g) the amount with which a user is attributing the individual connections to the overall system.

The method according to the function in above Step (b) makes use of a weighted combination of the individual quality scores.

The method according to the function in above Step (d) modifies the computation of the weights depending on the mutual influence, the amount of attention, the amount of attribution and/or further additional factors.

The method according to the function in Step (e) includes a method to assign the individual connection quality scores to the function terms, whereas this method can be inferred via knowledge-based findings, learned from the data, or combinations of these.

Accordingly, the computation of the weights is dependent on the ranking of the quality scores of the individual connections.

According to a further aspect of the present invention, the ranking-dependent computation of the weights is applied to the individual connections of the other participants, while the computation of the weight for the connection from a user to himself or herself is treated independently from that ranking.

According to a further aspect of the present invention, the computation of each weight per individual connection is a function of the quality scores of the other individual connections.

Accordingly, the influence of the other connections on the computation of one weight is implemented such that lower quality scores of the other connections lead to a smaller computed weight and that higher quality scores of the other connections lead to a larger computed weight.

According to a further aspect of the present invention, the computation of the weights is dependent on statistics such as—but not exclusively—average, maximum or minimum value of the individual connections quality scores.

According to a further aspect of the present invention, the computation of weights using said statistics is such that the weighted sum, i.e. the overall quality prediction, is closer to the minimum individual connection quality score in case of lower average values of those individual connection quality scores.

According to a further aspect of the present invention, the computation of weights using said statistics is such that the weighted sum, i.e. the overall quality prediction, is closer to the average of the individual scores or, alternatively the maximum individual score, in case of higher average values of those individual connection quality scores.

According to a further aspect of the present invention, the computation of the weights is dependent on the estimated amount of attention that is paid to each individual connection.

According to a further aspect of the present invention, the computation of weights using said estimate is such that the weight for an individual quality rating increases with a higher estimated amount of attention for that individual connection, and decreases with a lower estimated amount of attention.

According to a further aspect of the present invention, the computation of the weights is such that amount of attention to individual connections is computed in relation to an equally balanced distribution of attention, leading to a function of the total number of individual connections.

According to a further aspect of the present invention, the computation of the weights is dependent on the estimated amount of attention that is paid to the audio and video modalities of each individual connection.

According to a further aspect of the present invention, the computation of the weights is based on a weighted combination of the audio and video qualities.

According to a further aspect of the present invention, the computation of the weights for the audio and video qualities for each individual connection is a function of the audio quality of that connection.

According to a further aspect of the present invention, the computation of the weights for the audio and video qualities for each individual connection is a function of the overall audio quality of the whole multiparty call.

According to a further aspect of the present invention, the computation of the weights incorporates the amount of active speech time on each individual connection.

According to a further aspect of the present invention, the computation of the amount of active speech time excludes time periods of mutual silence, i.e. periods with no speech on any of the connections.

According to a further aspect of the present invention, the computation of the weights incorporates the amount of time a user is looking at the screen.

According to a further aspect of the present invention, the computation of the weights incorporates the amount of time a user is looking at those parts of the screen on which the interlocutors are displayed.

According to a further aspect of the present invention the computation of the weights incorporates auxiliary information about the social importance of a participant.

According to a further aspect of the present invention, the computation of weights is dependent on the results of a degradation estimation algorithm determining the type of degradations of the individual connections.

According to a further aspect of the present invention, the computation of weights using said degradation estimation algorithm results is optimized for individual degradations.

According to a further aspect of the present invention, the computation of weights using said degradation estimation algorithm results is optimized for combinations of degradations.

According to a further aspect of the present invention, the computation of weights using said degradation estimation algorithm results is optimized by grouping degradation types into audio, visual and audiovisual degradations.

According to a further aspect of the present invention, the computation of weights is dependent on an estimation of the impact of individual connections with sufficiently different qualities compared to the other connections, which are referred to from this point forward as outlier connections.

According to a further aspect of the present invention, the computation of weights incorporates an identification of individual connections that should be treated as outlier connections.

Said identification computes thresholds to determine if a connection should be treated as an outlier connection or not.

Said thresholds are computed as a function of the degree of the variation of the individual connection quality scores across all individual connections, preferably expressed by statistics such as the confidence interval.

According to a further aspect of the present invention, the computation of the impact of outliers is a function of the number of outlier connections such that the impact increases with an increasing number of outlier connections.

According to a further aspect of the present invention, the computation of the impact of outlier connections is a function of the degree of quality variation across all individual connections such that the impact decreases with an increasing degree of quality variation.

According to a further aspect of the present invention, the computation of weights is dependent on the results of an analysis determining if users can perceive differences between the individual connections.

According to a further aspect of the present invention, the computation of weights is dependent on said analysis results in conjunction with the individual connection quality scores.

According to a further aspect of the present invention, the computation of weights is such that if differences cannot be perceived and the individual connection quality scores are located in a lower quality range, then the weighted sum, i.e. the overall quality prediction, is lower than the minimum of the individual connection quality scores.

According to a further aspect of the present invention, the computation of quality scores for each individual connection is based on a quality prediction method that is dedicated to compute the quality scores for each individual connection via parametric technical information.

Said computation of individual connection quality scores considers the presence of the others connections by integrating the parametric information of the other connections into the computation.

According to a further aspect of the present invention, the computation of individual connection quality scores is based on a quality prediction method that is dedicated to compute the quality scores for each individual connection via signal analyses.

Said computation of individual connection quality scores considers the presence of the others connections by integrating any possible signal paths provided by the other connections into the signal analysis.

The method according to the present invention may be provided by an apparatus.

The steps of the method according to the present invention may be performed by the computer-executable instructions of a computer program when the program is run on a computer.

The present invention concerns the computation of quality of a multiparty telecommunication service or system as it is perceived by each individual participant, where computation also refers to prediction. For that purpose the invention is exploiting four characteristics of such multiparty telecommunication scenarios.

Figure 1:
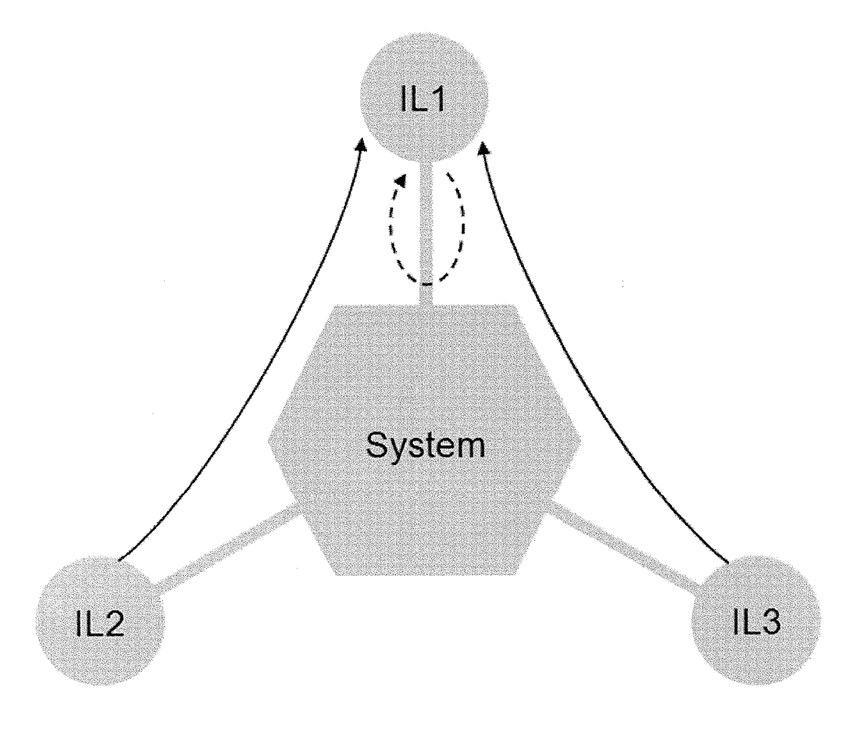
FIG. 1 shows a concept of individual connection quality between 3 interlocutors from the perspective of one interlocutor.

FIG. 1 illustrates individual connections between 3 interlocutors (IL1, IL2, IL3) from the perspective of IL1, the symbol → refers to Audio & video signal paths from ILi to IL1, where i=2 or 3, determining the Individual Connection Quality Scores $Q_i$, while the symbol ------▸ refers to "Feedback" signal paths from IL1 back to IL1, determining the Individual Connection Quality Scores $Q_i$ of the "own" connection. Note that signal paths are an abstraction from actual technical implementation.

A first characteristic exploited by the invention is the mixture of quality factors and levels in the same multimedia conference call. This is caused by the fact that participants may use different terminal equipment, may be connected to the call via different network types, may be located in environments with different acoustic and lighting properties, and may be located at different distances and angles from their terminal devices (e.g. microphones, loudspeakers, cameras, video screens).

The presence of such mixtures of quality for individual participants is often referred to as asymmetric multiparty quality; the special case that environment, equipment and connections are equal (e.g. telepresence rooms), is often referred to symmetric multiparty quality. In both symmetric and asymmetric cases, the overall quality of the whole multiparty call is obtained by some integration of the contributions of the individual quality-levels, i.e. the quality scores of the individual connection of each participant into the call.

The present invention is exploiting this aspect by computing an overall multiparty quality score based on the quality scores for each individual connection.

A second characteristic is the influence of contextual factors on quality perception, an effect that is well known in the state-of-the-art. The present invention is exploiting one particular aspect of contextual influence, i.e. the fact that users are exposed to multiple connections of possibly different quality simultaneously, and that those connections can have a mutual influence on each other. In contrast to the first characteristic, this point does not address the mixture of the quality related with individual participants, but their mutual (contextual) influence.

This mutual influence can be of a physical nature, i.e. signal paths or signal interferences which are only there due to the presence of the other connections. An example is the case of acoustic echo caused by the terminal device of one participant. In such a case, and assuming that possibly taken echo-cancellation measures cannot extinguish the echo, the signal paths in a multiparty scenario would lead to talker echo (a user hears herself or himself) and listener echo (a user hears other participants, who are not the ones causing the echo, multiple times). In a conventional two-party case, i.e. in absence of the other connections, the user would only perceive talker echo, assuming that there is only that one echo source in the connection.

This mutual influence can also be of a perceptual nature, i.e. degradations on one connection may lead the user to perceive that several or all connections are degraded. An example again is that of acoustic echo. In such a case one may hear listener echo from all participants except the one who is actually causing the echo. This, however, can lead to a perception that there is listener echo on actually all voices, because participants may not be able to identify that there is one voice without listener echo.

The present invention is exploiting this aspect by computing an estimation of such a mutual influence of the individual connections on each other and then taking this into account in the computation of the overall multiparty score.

A third characteristic exploited by the invention is that users do not necessarily pay an equal amount of attention to all the individual connections. Instead, users often switch their attention during the call to different participants. Furthermore, in case of audiovisual communication, the users may also shift their attention between the audio or video modalities. The switching of attention can have different reasons, in particular communicative reasons, social reasons or technical reasons.

Concerning communicative reasons, users pay attention to those participants who have an important contribution to the call at a given point in time. Regarding the audio communication modality, this essentially means the participant who is currently speaking. Regarding the video communication modality, this means the participant who is currently sending some important visual information (e.g. non-verbal signs indicating that someone wants to say something next or confirming something was understood, or showing an object of interest into the camera). Regarding both audio and video communication modalities, the focus of participants depends on the task at hand. For example, if participants need to look a lot at papers or documents, the perceptual impact of video degradations is less than in a situation in which participants focus more on the video communication channel.

Concerning social reasons, users may pay attention to those participants who have an important social role, i.e. key decision makers or superiors, regardless if these people actively contribute to the conference call or not.

Concerning technical reasons, users pay attention to those participants whose connections have a particularly different (usually lower) quality than the other connections. Here, interaction with the social role of that participant and the general contribution to the conversation will play a modifying role. Regarding the audio communication modality, if the speech signal of one participant is strongly degraded, the other participants will need to spend much concentration effort to understand that speaker, hence they will pay a lot of attention to this particularly bad connection. Regarding the video communication modality, if the picture of one participant is strongly degraded, the other participants will likely be more aware of that obvious degradation than of any other minor degradation that the other pictures might also have.

Regarding both audio and video communication modalities, the focus of participants depends also on the combination of audio and video degradations. For example, if the audio communication is undisturbed, then participants will be able to pay more attention to video degradations. If, however, the audio communication is degraded, then the perceived quality impact of video degradations will be reduced, as participants need to concentrate more on the audio communication modality. This effect has been observed on studies on audiovisual quality assessment. However, there is also a multiparty-specific component to it, as this shift of attention has an impact on the mapping function from individual connection qualities to overall quality: In case of high overall audio quality, the impact of individual connections with low video quality is stronger than in case of low overall audio quality.

The present invention is exploiting the effect of attention in terms of its first aspect—the amount of attention per connection—by computing an estimation of the amount of attention that a participant is paying to the individual connections and then taking this into account in the computation of the overall multiparty score. Technically, this estimation is achieved by applying algorithms such as, but not exclusively, voice activity detection for analyzing the audio communication modality, eye gaze estimation for analyzing the video communication modality, or metadata analysis (e.g. host of the call, social network data, status information) to estimate the social importance of participants.

The present invention is exploiting the effect of attention in terms of its second aspect—the amount of attention per communication modality—by estimating the amount of attention that participants are paying to the audio and the video signals and taking this into account in the computation of the overall multiparty score. Technically, this estimation is achieved by first determining the audio signal quality and the video signal quality based on methods available in the field—using perceptual ratings or instrumental predictions, second by computing the overall audio quality of the conference, and third by computing the relative importance of the video modality as a function of the overall audio quality. Then this relative importance is integrated into the computation of the overall quality.

A fourth characteristic of such multiparty telecommunication scenarios, which the present invention is exploiting, is that users do not necessarily attribute all quality impairments that they may perceive from the individual connections to the overall system. In some cases, users attribute such impairments to that individual connection alone and, from a perception point of view, independently from the system they are using. As an example, any quality impairments caused by the acoustic or visual environment of an individual participant, e.g. background noise or bad lighting, are typically not attributed to the conferencing system but only to the environment or the end device of that participant. If this was always the case, then this would be a trivial aspect to handle, e.g. by simply neglecting the individual environments in the computation of the overall quality. However, the quality attribution may shift away from the individual environments and end devices to the whole conferencing system, depending on two aspects: a) the number of individual connections with degradations that are substantially different from the others and b) presence of degradations that cannot be assigned to any individual participant.

The first aspect is the number of individual connections with quality impairments that are substantially different from the other connections. Henceforth, such connections will be called outliers. If there are more than one or two of such individual connections with low quality, then users start to blame the overall system as such instead of simply considering those individual environments or end devices as outliers. However, the impact of outliers is not only a function of the number of such outliers but also a function of the quality distribution across individual connections. If there are one or two such outlier connections, and the qualities of the other connections are rather similar and high, then the impairment of connections will be less attributed to the overall system quality as described above. However, if also the qualities of the other connections are rather dissimilar, then the contribution of those outlier conditions to the overall quality will be increased, because—in view of the users—those conditions are not anymore just a few outliers, but the overall system appears to suffer at various points.

The second aspect is a particular situation in which degradations cannot be assigned to any individual participant, i.e. the degradation source cannot be identified by participants. An example is constantly audible acoustic background noise picked up by the terminal of one participant. In such a case users may not be able to assign the background noise to a specific connection. In this case, users attribute the degradation to the overall system in such a way that the overall judgment may be lower than any individual connection quality score.

The present invention is exploiting this effect of attribution in terms of its first aspect—the impact of "quality-outliers"—by identifying if there are any outliers among the individual connections and then computing specific weights for such outliers. Technically, the identification of such outliers can be done using statistical measures (e.g. mean values & confidence intervals) and threshold operations (e.g. if a rating is far outside confidence interval, then it is considered as outlier). Then, the computation of a weight for each such outlier is realized as a function of the total number of outliers (realized by counting the identified outliers) and the degree of quality variations (realized by using appropriate statistical measures such as confidence intervals).

The present invention is exploiting this effect of attribution in terms of its second aspect—the impact of unidentifiable degradation sources—by estimating if degradations cannot be assigned by participants to any individual connection and then computing a special weight for all individual connections. Technically the identification can be done by different approaches, that is, by comparing the individual connection rating, by applying a rule-based approach exploiting parametric information (e.g. echo parameters or background noise parameters), or by applying a correlation analysis estimating if a degradation is perceivable independently from the participant voices in the individual connections.

Exemplary embodiments of the present invention are further described in the following paragraphs.

The technical implementation of the present invention includes a set of algorithmic and mathematical solutions which cover the aforementioned four characteristics.

Overall Score Computation

Concerning the first characteristic—the computation of an overall score based on individual connection quality scores—the implementation first computes the individual quality scores of each individual connection by using one or more methods available in prior art to perform this task. For example, those methods can be based on a collection of user judgments after each call or on an instrumental computation of the quality scores. Then the implementation computes the overall quality score Q using a weighted sum of the individual quality scores Q where sum also refers to combination i.e.:

$$Q=\Sigma(w_i*Q_i), \text{ where } W_i \text{ refers to individual weight.}$$

Alternatively, a product term or any other non-linear operation may be used, depending on the actual system, use cases and subjective user test data that are considered when applying the present invention.

There is one prerequisite that the computation of Q requires when the weights contain constant coefficients that are not equal for all individual connection quality scores $Q_i$. If this is the case, then the assignment of the individual connection quality scores to the weights must be well defined. To explain this aspect, consider the following example. Suppose that the computation of Q for a conference call with three participants is $Q=w_A*Q_A+w_B*Q_B+w_C*Q_C$, where $w_A$, $w_B$, and $w_C$ are three different fixed weights, and $Q_A$, $Q_B$ and $Q_C$ are the individual connection quality scores. In order to run this computation, there must be a method that determines which of the three individual connection quality scores is actually $Q_A$, which is $Q_B$, and which is $Q_C$, and hence which are assigned the respective weights $w_A$, $w_B$, and $w_C$. Such a method can be inferred via knowledge-based findings, learned from the data, or combinations of these. For instance, $Q_A$ could be determined as the individual connection quality score for the conference participant who was the host, or who entered the conference last, or who had a specific technical connection, or whose individual connection quality score is the best, or who spoke most during the conference, or whose auxiliary status information showed that he or she is a key person, or who is located in a certain physical location, etc.

The actual method of computing the weights $w_i$ constitutes the technical exploitation of the other three characteristics mutual influence, amount of attention and amount of attribution.

Mutual Influence with 3 Implementation Variants

Concerning the second characteristic —the computation of the mutual influence—there are different variants possible for an implementation, which in practical modelling of user tests have shown optimal performance in predicting the quality ratings obtained from test users.

The first implementation variant to model mutual influence analyzes the ranking between the individual connection quality scores and then assigns different pre-computed weights $w_1$ to $w_N$ to each individual connection quality score $Q_1$ to $Q_N$, according to these ranking results. In that respect it constitutes an easy and robust method to assign the individual connections to the weights (see discussion above). Furthermore, it indeed models also the mutual influence, as a ranking of values in general means that the mutual interrelations of those values are examined.

In practice this implementation variant means, if the scores are sorted in descending order, the weight $w_1$ is assigned to the highest score $Q_1:=Q_j=\max(Q_i)$, $w_2$ to the second highest score $Q_2:=Q_{j+1}=\max(Q_i)|_{\forall i\neq j}$, and so on until the last weight $w_N$ is assigned to the lowest score $Q_N:=Q_{j+N-1}=\min(Q_i)$.

The pre-computation of the weights $w_1$ to $w_N$ can be done via data fitting procedures using perceptual quality ratings as ground-truth data. To optimize performance, an implementation may use one fixed set of those pre-computed weights, or it may select one of more such sets of weights, which have been pre-determined for different situations, i.e. use cases, technical conditions and the like.

Another optimization possibility is to treat the connection from a user to himself or herself separately from the connections of the other participants. This can account for the fact that in most cases an evaluation of someone's own connection to the conference is more hypothetical than evaluations of the other connections. This can be explained by the following fact. In the most cases, a participant receives only the speech and video signals from the other participants, which enables the participant to give a quality judgment based on perceived signals. In such cases the participant can infer the quality of the own connection only from indirect cues such as comments from the other interlocutors, so that respective interpretations are more of hypothetical nature.

In practice this specific treatment of the own connection means that it will be excluded from the ranking procedure and a specific pre-computed weight will be assigned to the own connection.

The second implementation variant to model mutual influence is to compute each weight $w_1$ to $w_N$ as a function of the individual connection quality scores of the other connections, which corresponds to a direct modeling of the mutual influence.

Comparing the perceptual quality ratings of technically identical connections, which had different technical conditions on the connections of the other participants showed the following behavior: If the other connections were of a lower quality, then also the currently considered connection got a lower quality rating; if the other connections were of a higher quality, then the currently considered connection got a higher quality rating. This effect was found although in both cases the technical conditions of the observed connection were the same. In other words, the perceptual quality of a particular connection is positively correlated with the perceptual quality of other connections, even though the technical quality is the same.

In practice this means that each weight is computed as an increasing function of the other individual connection quality scores such that higher individual connection quality scores lead to a larger computed weight. Based on perceptual quality ratings, one possible realization of this increasing function proved to provide good performance, which will be outlined now:

Each weight $w_1$ for a connection i is a product of monotonically increasing functions, such as for example sigmoid functions $\sigma_j(Q_j)$, one such function for each connection $j\neq i$, and each such function having the quality rating of that connection $j\neq i$ as input variable. An example using one form of a sigmoid function is:

$$w_i=\Pi\sigma_j(Q_j), \forall j\neq i, \text{with } \sigma_j(Q_j)=1/(1+\exp(-s_j*(Q_j-o_j)))$$

The coefficients $s_j$ and $o_j$ determine the steepness $s_j$ and the offset from the origin $o_j$ of the sigmoid function and are pre-determined based on perceptual quality ratings by data fitting procedures.

Notice that a robust realization of the second implementation variant requires the mentioned method of assigning the individual quality ratings to the weights. The reason is that the function coefficients $s_j$ and $o_j$ are fixed and require to be pre-computed using data fitting procedures. This in turn requires that the assignment method of the individual connection quality scores $Q_j$ to the sigmoid functions during the data fitting procedure is again applied when running the computation during actual operation of the invention. An easy way to do this is to incorporate the first implementation variant into this second implementation variant, i.e. to rank the individual quality ratings before using them in the computation of the sigmoid functions $\sigma_j(Q_j)$ and of the overall score Q.

The third implementation variant to model mutual influence is to compute a weighted sum of the mean, maximum and the minimum individual connection quality scores. The method of computing the weights models the following mutual influence, which could be observed by analyzing perceptual quality judgments: If the overall quality is rather high, then the mean and to some extend also the maximum of the individual connection quality scores is close to the overall score, if the overall quality is rather low, then the minimum of the individual connection quality scores is close to the overall score. In practice this means that the computation of the three weights—one for the mean term, one for the maximum term and one for the minimum term of the weighted sum—are functions of an initial estimate of the overall quality. This initial estimate can be a simple mean or maximum or minimum of the individual connection quality scores or even a more sophisticated estimate, e.g. by using the previous implementation variants. These functions are realized such that for an increasing estimate of the overall quality, the weight of the minimum term is decreasing and the weight of the mean term and the maximum term are increasing. One possible realization of this increasing function proved to provide good performance in relation to perceptual quality ratings, which will be outlined now:

Overall quality is: $Q = w_1 * \text{mean}(Q_i) + w_2 * \text{min}(Q_i) + w_3 * \text{max}(Q_i)$.

The weighting function for the mean term is: $w_1 = \sigma_1(Q_{est}) = 1/(1+\exp(-s_1*(Q_{est}-o_1)))$.

The weighting function for the minimum term is: $w_2 = \sigma_2(Q_{est}) = 1/(1+\exp(-s_2*(Q_{est}-o_2)))$.

The weighting function for the maximum term is: $w_3 = \sigma_3(Q_{est}) = 1/(1+\exp(-s_3*(Q_{est}-o_3)))$.

The initial estimate of the overall quality is: $Q_{est} = \text{mean}(Q_i)$.

The coefficients $s_1, s_2, s_3, o_1, o_2$, and $o_3$ determine the steepness and the offset from the origin of the sigmoid functions and are pre-determined from perceptual quality ratings by data fitting procedures. To ensure that $w_1$ and $w_3$ are increasing and $w_2$ is decreasing with increasing $Q_{est}$, the steepness coefficients need to have positive values: $S_1>0$ and $S_2>0$ and $S_3>0$. In that case the required behavior of $w_1$ and $w_2$ and $w_3$ is realized by the minus sign in front of $s_1$ and $s_3$ and the plus sign in front of $s_2$.

Notice that the third implementation variant is a special case of the first implementation variant, due to the following relation:

$$Q = w_1 * \text{mean}(Q_i) + w_2 * \text{min}(Q_i) + w_3 * \text{max}(Q_i)$$
$$= w_1 * 1/N \Sigma Q_i + w_2 * \text{min}(Q_i) + w_3 * \text{max}(Q_i)$$
$$= (w_1/N + w_3) * Q_j + (w_1/N) * Q_{j+1} + \ldots + (w_1/N + w_2) * Q_{j+N-1}$$
$$= w'_1 * Q_j + w'_2 * Q_{j+1} + \ldots + w'_N * Q_{j+N-1},$$

where
$w'_1 = (w_1/N + w_3), w'_2 = w'_3 = \ldots = w'_{N-1} = (w_1/n), w'_N = (w_1/N + w_2)$ with $Q_j = \max(Q_i) = $ highest individual score, $Q_{j+1} = \max(Q_i)|_{\forall i \neq j} = $ second highest score, and $Q_{j+N-1} = \min(Q_i) = $ minimum score.

Amount of Attention Paid to Individual Connections

Concerning the third characteristic in its first aspect—the computation of the amount of attention paid to individual connections—different variants are possible for an implementation, depending on the type of information that can be exploited and how this information is incorporated into the computation of the weights.

A method of exploiting audio signals to estimate the amount of attention is based on the results of a voice activity detection algorithm: If one participant is speaking more than others, then any distortions of his or her speech signal are more often audible than distortions of the other speakers, where the amount of attention also refers to amount of active speech time. That means listeners are likely to pay more attention to the individual connection of this speaker, except in cases in which listeners stop listening to the call for some time, for example due to a distraction caused by concurrent activities.

A method of exploiting video signals to estimate the amount of attention could be based on the results of an eye gaze estimation algorithm: If one participant is more frequently looking into the direction of the screen part showing one particular interlocutor, then it is highly likely that the participant is also paying more attention to the individual connection of that particular interlocutor, where the amount of attention also refers to the amount of time.

A method of exploiting audio or video signals to estimate the amount of attention is based on the results of a degradation estimation algorithm: If there is a particularly strong audio, video, or audiovisual degradation on the individual connection of one participant, then it is likely that the other participants' attention will be drawn more often to that connection than to the other connections, especially if the others need to concentrate more to understand that particular participant. Examples for such a degradation estimation algorithm could be applied to state-of-the-art signal processing and machine learning methods to detect the presence of temporal discontinuity, noisiness, and spectral coloration in the speech or video signal. Other examples could use auxiliary technical information (e.g. measured network parameters, terminal device logging data, packet header analysis) to estimate the presence of such degradations.

A method of exploiting auxiliary information (e.g. social network information, electronic business card, call status information, call history information) is to estimate the amount of attention based on the social importance of a participant. For example, if a participant has many active social network contacts, or if the electronic business card identifies a participant as a key decision maker, or if the call status information identifies a participant as the call's host, or if there were many calls in the past with this participant, then it is likely that this particular participant has a high social importance either in general, in the context of that call or at least for that interlocutor who had frequent calls with that participant in the past. Then, it is likely that the other interlocutor or interlocutors pay most attention to that particular participant.

Once the amount of attention that a participant is paying to the individual connections is estimated, the present invention uses this input to modify the computation of the weights. In practice this means that the weight for an individual quality rating is increasing with an increasing estimated amount of attention for that individual connection.

A straightforward approach to realize this for any of the above-mentioned computation methods of Q is to substitute the individual quality ratings $Q_i$ with modified ratings $R_i=a_i*Q_i$, with $a_i$ reflecting the amount of attention paid per connection.

There is an important aspect that should be incorporated into the computation of the factors $a_i$. These factors should not simply contain the amount of attention to individual connections in relation to the total spent amount of attention, i.e. $a_i$=x % of total attention, paid to participant i. Instead these factors should contain the amount of attention to individual connections in relation to an equally balanced distribution of attention, i.e. $a_i$=(x % of total attention paid to participant i)/(n % of total attention when equally distributed)=(x % of total attention paid to participant i)/(100/ number of participants)=(x % of total attention paid to participant i)*number of participants/100.

Furthermore, a possibility to optimize performance is to exclude periods of mutual silence (all participants are silent simultaneously) from the computation. This models the effect that participants actually do not pay attention to the call, if there is no information to be shared.

Amount of Attention Paid to Audio and Video Modalities

Concerning the third characteristic in its second aspect—the computation of the amount of attention paid to the different modalities—different variants are possible for an implementation.

One implementation variant is based on an estimation of the audio-only and video-only quality of each individual connection, followed by a computation of the relative importance of audio quality and the video quality as a function of the audio quality for each connection. Technically, the first step is achieved by determining the audio quality and the video quality based on methods available in the field using perceptual ratings or instrumental predictions. The second step—the computation of that relative importance—can be achieved via data fitting procedures known in the state of art, using perceptual quality ratings as ground-truth data.

Another implementation variant differs from the previous one by computing the relative importance not per individual connection but as a function of the overall audio quality of the whole multiparty call.

Another implementation variant exploits the methods that can also be used for estimating the amount of attention paid to individual connections, that is, a combination of audio signal-based methods (e.g. voice activity detection), video signal-based methods (e.g. eye gaze detection), or a degradation estimation algorithm. The outputs of those methods are used to estimate if a participant is paying more attention to the video or audio modality, which is then translated into a modification of the weighting factors.

Amount of attribution due to outliers, i.e. individual connections with quality impairments that are substantially different from the other connections Concerning the fourth characteristic in its first aspect—the computation of the amount of attribution influenced by outliers—the technical implementation consists of two stages: identification of individual connections that should be treated as outliers, and computation of a weight for each outlier, whereas that weight is a function of the number of outliers and the degree of quality variation across all individual connections.

In practice this means that the identification stage determines if a connection should be treated as an outlier, i.e. if the individual quality rating is above or below the range of values that are not considered as outliers. This can be done by using threshold operations or other robust statistics. In case of using threshold operations, the threshold may be a fixed value and may be selected by the developer or obtained from perceptual quality ratings using data fitting procedures; or the threshold may be adaptive. One optimized way to implement such an adaptive threshold operation is to compute the threshold as a function of the spread of ratings, for example as a function of the mean value and the 95% confidence interval $CI_{95}$, combined with a coefficient $\alpha$ obtained from perceptual quality ratings using data fitting procedures. Thus, a possible implementation is: $threshold_{up}=mean(Q_i)+\alpha*CI_{95}(Q_i)$, $threshold_{low}=mean(Q_i)-\alpha*CI_{95}(Q_i)$.

Once all outliers are identified, the next step is to model the effect that the amount of attribution of such outliers to the overall quality rating depends on the number of such outliers. If there is just one such outlier, its contribution to the overall quality should be small, if there are more such outliers, then their contribution should be large. In practice this means that the weight for an outlier is an increasing function of the number of identified outliers $NUM_{Outliers}$, where the weight may also refers to the impact. One possible way to implement such a function is a linear function $w_{Num}=a*(Num_{Outliers})+b$, whereas the coefficients a and b are constant. An optimal computation of a and b is: $a=(1-\beta)/(N-1)$, $b=(N*\beta)/(N-1)$, with $\beta$ determining the minimum possible weight in case that there is only one outlier, and N=total number of connections. The advantage of this particular realization is that the weight will be equal to one in the hypothetical case that all connections are detected as outliers, which means they are actually not outliers and should be treated equally. Furthermore, in case of a large total number of interlocutors the weight also converges against a value of one, independently from the number of outliers. This behavior means that in case of many connections the effect of individual outliers can be neglected.

The next step is to model the effect that the amount of attribution of outliers to the overall quality rating depends also on the spread of quality values of all connection, where the amount of attribution also refers to the impact. If all connections except the outliers are rather similar, then the effect of individual outliers is solely modeled by the previous step, which means the corresponding weight is reduced. If all connections have rather different quality ratings, then the effect of individual outliers is weaker than in the previous case, which means the corresponding weight needs to be less reduced compared to the previous case. In practice this means that the weight will be extended with a second function, which is increasing with an estimation of the spread (e.g. $CI_{95}$). One possible way to implement such a function is a linear function $w_{Spread}=c*(CI_{95})+d$, whereas the coefficients c and d are constant. An optimal computation of c and d is: $c=(1-\delta)/\chi$, $d=\delta$, with $\chi$ determining the value of $CI_{95}$ for which the weight should be equal to one, and $\delta$ determining the minimum weight in case that $CI_{95}$ is equal to zero.

One way to model the effect of attribution based on outliers is, if the above mentioned implementations are used, to compute a specific weight for all identified outliers i: $w_{Out,i}=w_{Num}*w_{Spread}$.

A straightforward approach to realize this attribution modeling due to outliers is to substitute the individual quality ratings $Q_i$ with modified ratings $S_i=a_i*Q_i$, with $a_i=w_{Out,i}$ if $Q_i$ is an outlier, and $a_i=1$ if $Q_i$ is not an outlier.

Amount of Attribution Due to Unidentifiable Degradation Sources

Concerning the fourth characteristic in its second aspect—the computation of the amount of attribution influenced by unidentifiable degradation sources—consists of two stages: the estimation if such an unidentifiable degradation is present and the computation of a weight for all connections that reduces the overall quality.

The identification stage depends on the method used for obtaining the individual connection quality scores.

If the method is using subjective ratings, then a comparison of the individual connection ratings will reveal if participants assign the same ratings to all connections, and the actual value of those ratings will indicate if the similar ratings stem from such a degradation (i.e. ratings are low) or if the similar ratings stem from the fact that everything is satisfactory, and no degradation is present at all (i.e. ratings are high).

If the method uses parametric quality estimations, then a rule-based approach can be used to identify such cases. For example, if the parametric analysis reveals additive background noise is present, then this degradation is—per rule—defined to be such an unidentifiable degradation.

If the method uses signal analysis, then an algorithm estimating the temporal correlation between occurrences of the degradation and the original speech can be used to infer if the degradation can be assigned by participants to individual speakers (i.e. connections) or not: if the correlation is high, then the degradation is perceivable only if an individual participant is speaking and thus can be assigned to an individual connection; if the correlation is low, then degradation is perceivable independently from an individual speaker and thus cannot be assigned to an individual connection.

The second stage—the computation of weights—can rely on pre-computed weights for such degradations which have been obtained from perceptual ratings using data fitting procedures. In addition, the computation of such a weight can also incorporate the actual values of the individual connection quality scores: if the ratings are high, the weight is close to one, if the values are low, the weight is close to a minimum weight determined by the perceptual ratings. In addition, the weight can also incorporate a measure for the certainty that an unidentifiable degradation is present, e.g. a probability measure or even the correlation measure, in case the signal-based method is used: the higher the certainty that the degradation is present, the lower the weight.

Furthermore, the weight can be computed such that the following effect is modelled: if differences cannot be perceived and the individual connection quality scores are located in a lower quality range, then the weighted sum, i.e. the overall quality prediction, is lower than the minimum of the individual connection quality scores.

A straightforward approach to realize this attribution modeling due to unidentifiable degradations is to substitute all individual connection quality scores $Q_i$ with modified ratings $S_i = a_i * Q_i$, with $a_i < 1$ if such a degradations is present, and $a_1 = 1$ if not.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for estimating a quality of multiparty telecommunication with a computing device, the method comprising:
    (a) determining individual connection quality scores of individual connections of each participant in a multiparty telecommunication call; and
    (b) determining a quality score for the multiparty telecommunication call from a perspective of each participant using a function of the individual connection quality scores;
    wherein determining the quality score for the multiparty telecommunication call from the perspective of each participant utilizes a weighted combination of the individual connection quality scores, and wherein a computation of weights is dependent on the estimated amount of attention that is paid to the audio and video modalities of each individual connection.

2. The method according to claim 1, further comprising:
    (c) determining additional factors that influence an importance of individual connections to overall quality; and
    (d) including the additional factors into a computation of overall quality.

3. The method according to claim 2, wherein the additional factors include any combination of the following factors:
    (e) mutual influence of quality scores between the individual connections;
    (f) the amount of attention a user is paying to the individual connections;
    (g) the amount with which a user is attributing the individual connections to the overall system.

4. The method according to claim 3, wherein determining mutual influence of quality scores between the individual connections includes assigning the individual connection quality scores to function terms based on knowledge-based findings and/or based on data.

5. The method according to claim 2, wherein including the additional factors into the computation of overall quality includes the computation of the weights, wherein the computation of the weights is based on mutual influence, an amount of attention, an amount of attribution and/or further additional factors.

6. The method according to claim 5, wherein the computation of the weights is dependent on the ranking of the individual connection quality scores.

7. The method according to claim 6, wherein the ranking-dependent computation of the weights is applied to the individual connections of the other participants, while a computation of the weight for a connection from a user to himself or herself is treated independently from that ranking.

8. The method according to claim 5, wherein the computation of weight for an individual connection is a function of quality scores of other individual connections.

9. The method according to claim 8, wherein the influence of the other individual connections on the computation of weight for the individual connection is implemented such that lower quality scores of other individual connections lead to a smaller computed weight and that higher quality scores of other individual connections lead to a larger computed weight.

10. The method according to claim 5, wherein the computation of the weights is dependent on statistics.

11. The method according to claim 10, wherein the computation of weights using the statistics is such that a weighted sum is closer to a minimum individual connection quality score in case of lower average values of individual connection quality scores.

12. The method according to claim 10, wherein the computation of weights using the statistics is such that a weighted sum is closer to an average individual connection quality score or a maximum individual connection quality score, in case of higher average values of individual connection quality scores.

13. The method according to claim 5, wherein the computation of the weights is dependent on the estimated amount of attention that is paid to each individual connection.

14. The method according to claim 13, wherein the computation of weights using the estimate is such that the weight for an individual quality rating increases with a higher estimated amount of attention for that individual connection, and decreases with a lower estimated amount of attention for that individual connection.

15. The method according to claim 13, wherein the computation of the weights is such that amount of attention to individual connections is computed in relation to an equally balanced distribution of attention, leading to a function of the total number of individual connections.

16. The method according to claim 5, wherein the computation of the weights is based on a weighted combination of the audio and video qualities.

17. The method according to claim 16, wherein the computation of the weights for the audio and video qualities for each individual connection is a function of the audio quality of that connection.

18. The method according to claim 16, wherein the computation of the weights for the audio and video qualities for each individual connection is a function of the overall audio quality of the whole multiparty call.

19. The method according to claim 5, wherein the computation of the weights incorporates the amount of active speech time on each individual connection.

20. The method according to claim 19, wherein a computation of the amount of active speech time excludes time periods of mutual silence.

21. The method according to claim 5, wherein the computation of the weights incorporates the amount of time a user is looking at a screen.

22. The method according to claim 5, wherein the computation of the weights incorporates the amount of time a user is looking at parts of a screen on which interlocutors are displayed.

23. The method according to claim 5, wherein the computation of the weights incorporates auxiliary information about the social importance of a participant.

24. The method according to claim 5, wherein the computation of weights is dependent on the results of a degradation estimation algorithm determining the type of degradations of the individual connections.

25. The method according to claim 24, wherein the computation of weights using the degradation estimation algorithm results is optimized for individual degradations.

26. The method according to claim 24, wherein the computation of weights using the degradation estimation algorithm results is optimized for combinations of degradations.

27. The method according to claim 24, wherein the computation of weights using the degradation estimation algorithm results is optimized by grouping degradation types into audio, visual and audiovisual degradations.

28. The method according to claim 5, wherein the computation of weights is dependent on an estimation of the impact of outlier connections with sufficiently different qualities compared to the other connections.

29. The method according to claim 28, wherein the computation of weights incorporates an identification of individual connections that should be treated as outlier connections.

30. The method according to claim 29, wherein the identification utilizes thresholds to determine if a connection should be treated as an outlier connection or not.

31. The method according to claim 30, wherein the thresholds are computed as a function of the degree of the variation of the individual connection quality scores across all individual connections.

32. The method according to claim 28, wherein the estimation of the impact of outlier connections is a function of the number of outlier connections such that the impact increases with an increasing number of outlier connections.

33. The method according to claim 28, wherein the estimation of the impact of outlier connections is a function of the degree of quality variation across all individual connections such that the impact decreases with an increasing degree of quality variation.

34. The method according to claim 5, wherein the computation of weights is dependent on the results of an analysis determining if users can perceive differences between the individual connections.

35. The method according to claim 34, wherein the computation of weights is dependent on the analysis results in conjunction with the individual connection quality scores.

36. The method according to claim 34, wherein the computation of weights is such that if differences cannot be perceived and the individual connection quality scores are located in a lower quality range, then a weighted sum is lower than the minimum of the individual connection quality scores.

37. The method according to claim 1, wherein the determination of quality scores for each individual connection is based on a quality prediction method that is dedicated to compute the quality scores for each individual connection via parametric technical information.

38. The method according to claim 37, wherein the determination of individual connection quality scores considers the presence of the others connections by integrating the parametric technical information of the other connections into the computation.

39. The method according to claim 1, wherein the determination of the individual connection quality scores is based on a quality prediction method that is dedicated to compute the quality scores for each individual connection via signal analyses.

40. The method according to claim 39, wherein the determination of the individual connection quality scores considers the presence of the others connections by integrating any possible signal paths provided by the other connections into the signal analyses.

41. A computing device for estimating a quality of multiparty telecommunication, the computing device comprising:
- a processor; and
- a non-transitory computer-readable memory having processor-executable instructions stored thereon;
- wherein the processor is configured to execute the processor-executable instructions to facilitate:
  - (a) determining individual connection quality scores of individual connections of each participant in a multiparty telecommunication call; and
  - (b) determining a quality score for the multiparty telecommunication call from a perspective of each participant using a function of the individual connection quality scores;
- wherein determining the quality score for the multiparty telecommunication call from the perspective of each participant utilizes a weighted combination of the individual connection quality scores, and wherein a computation of weights is dependent on the estimated amount of attention that is paid to the audio and video modalities of each individual connection.

42. A non-transitory computer-readable medium having processor-executable instructions stored thereon for estimating a quality of multiparty telecommunication, the processor-executable instructions, when executed, facilitating performance of the following:
- (a) determining individual connection quality scores of individual connections of each participant in a multiparty telecommunication call; and
- (b) determining a quality score for the multiparty telecommunication call from a perspective of each participant using a function of the individual connection quality scores;
- wherein determining the quality score for the multiparty telecommunication call from the perspective of each participant utilizes a weighted combination of the individual connection quality scores, and wherein a computation of weights is dependent on the estimated amount of attention that is paid to the audio and video modalities of each individual connection.

\* \* \* \* \*